(12) United States Patent
Barnes et al.

(10) Patent No.: US 7,848,381 B2
(45) Date of Patent: Dec. 7, 2010

(54) MULTIPLE-WAVELENGTH TUNABLE LASER

(75) Inventors: Norman P. Barnes, Yorktown, VA (US);
Brian M. Walsh, Poquoson, VA (US);
Donald J. Reichle, Seaford, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 149 days.

(21) Appl. No.: 12/366,722

(22) Filed: Feb. 6, 2009

(65) Prior Publication Data
US 2009/0207868 A1    Aug. 20, 2009

Related U.S. Application Data

(60) Provisional application No. 61/029,020, filed on Feb. 15, 2008.

(51) Int. Cl.
*H01S 3/10* (2006.01)
*H01S 3/08* (2006.01)
*H01S 3/082* (2006.01)

(52) U.S. Cl. .............................. 372/97; 372/20; 372/92

(58) Field of Classification Search ................... 372/20, 372/21, 22, 92, 97, 99, 101, 108
See application file for complete search history.

(56) References Cited

U.S. PATENT DOCUMENTS

| | | | |
|---|---|---|---|
| 3,947,688 A | 3/1976 | Massey | |
| 4,734,912 A | 3/1988 | Scerbak et al. | |
| 4,864,584 A | 9/1989 | Martins | |
| 5,022,041 A | 6/1991 | Jacobs | |
| 5,058,980 A | 10/1991 | Howerton | |
| 5,295,143 A | 3/1994 | Rao et al. | |
| 5,333,142 A | 7/1994 | Scheps | |
| 5,408,481 A | 4/1995 | Scheps | |
| 5,457,707 A | 10/1995 | Sobey et al. | |
| 5,471,493 A | 11/1995 | Mirov et al. | |
| 5,577,060 A | 11/1996 | Nighan et al. | |
| 5,633,883 A | 5/1997 | Shi et al. | |
| 5,661,595 A | 8/1997 | Stamm et al. | |
| 5,764,662 A | 6/1998 | Pinto | |
| 6,654,391 B2 | 11/2003 | Adams | |

FOREIGN PATENT DOCUMENTS

| | | |
|---|---|---|
| JP | 63184383 | 7/1988 |
| JP | 04111484 | 4/1992 |
| JP | 06077577 | 3/1994 |
| JP | 08240528 | 9/1996 |

*Primary Examiner*—Armando Rodriguez
(74) *Attorney, Agent, or Firm*—Andrea Z. Warmbier; Helen M. Galus

(57) ABSTRACT

A tunable laser includes dispersion optics for separating generated laser pulses into first and second wavelength pulses directed along first and second optical paths. First and second reflective mirrors are disposed in the first and second optical paths, respectively. The laser's output mirror is partially reflective and partially transmissive with respect to the first wavelength and the second wavelength in accordance with provided criteria. A first resonator length is defined between the output mirror and the first mirror, while a second resonator length is defined between the output mirror and the second mirror. The second resonator length is a function of the first resonator length.

26 Claims, 2 Drawing Sheets

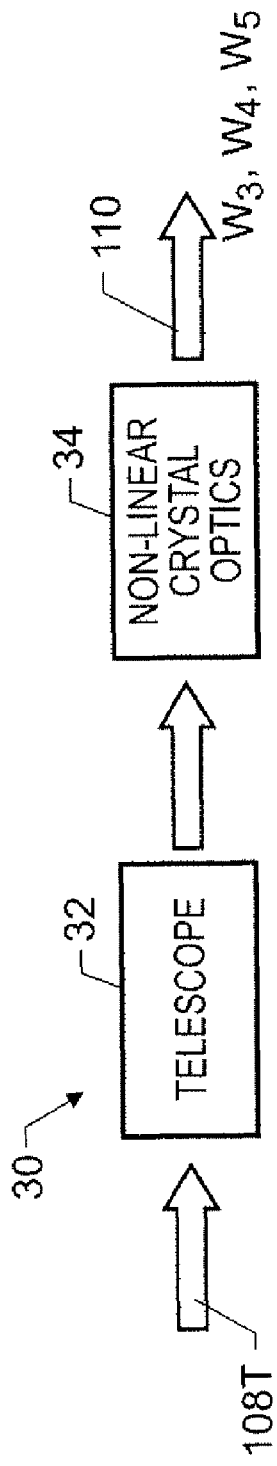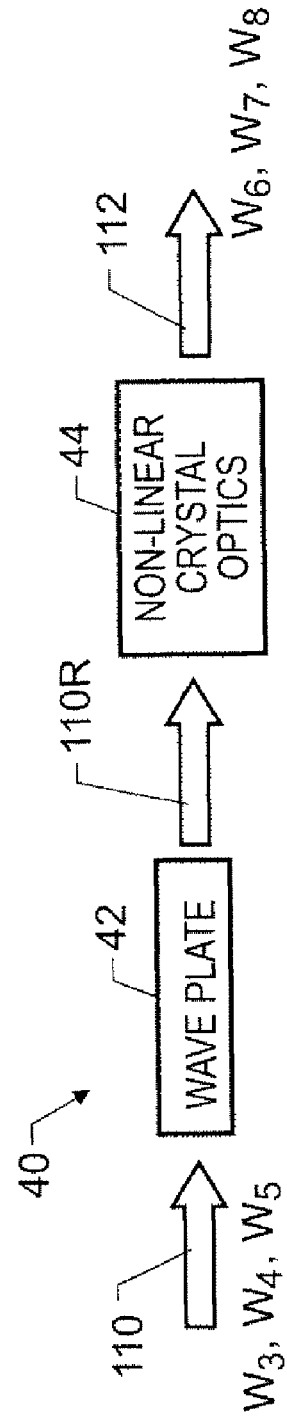

MULTIPLE-WAVELENGTH TUNABLE LASER

Pursuant to 35 U.S.C. §119 the benefit of priority from provisional application 61/029,020, with a filing date of Feb. 15, 2008, is claimed for this non-provisional application

ORIGIN OF THE INVENTION

The invention was made by employees of the United States Government and may be manufactured and used by or for the Government of the United States of America for governmental purposes without the payment of any royalties thereon or therefor.

BACKGROUND OF THE INVENTION

1. Field of the Invention

This invention relates to tunable lasers. More specifically, the invention is a tunable laser that can simultaneously produce multiple synchronized laser beams at unique wavelengths using a single laser source.

2. Description of the Related Art

High-peak pulsed laser sources are needed at various wavelengths throughout the visible and ultraviolet region. Many applications also require a pulsed laser source to be tunable. Among the applications requiring tunable lasers are remote sensing applications (e.g., remote ozone sensing), color displays, and lithography.

Although there are some lasers that can possibly address the needed spectral regions, most present serious drawbacks. For example, dye lasers can be used to produce laser wavelengths throughout much of the visible spectrum. However, the dyes have a short lifetime and must be replaced frequently. Furthermore, some of the dyes and solvents are carcinogenic thereby complicating their replacement and disposal. In addition, the high-gain and short upper laser level lifetime lasers associated with dye lasers makes it difficult for these lasers to provide good beam quality.

With respect to the ultraviolet spectrum, rare gas halogen excimer lasers provide coverage for some of this wavelength spectrum. However, the halogens corrode the laser chamber and simultaneously deplete themselves. Halogens also pose a health hazard. Still further, the short upper laser level lifetimes associated with excimer lasers require the use of high-voltage, high-current electrical discharges. These discharges cause reliability concerns and may affect other electronic instruments.

SUMMARY OF THE INVENTION

Accordingly, it is an object of the present invention to provide a tunable laser.

Another object of the present invention is to provide a tunable laser that can produce multiple wavelengths in a variety of spectral regions.

Still another object of the present invention is to provide a tunable laser that can produce multiple wavelengths in a variety of spectral regions in a simple and safe manner.

Other objects and advantages of the present invention will become more obvious hereinafter in the specification and drawings.

In accordance with the present invention, a tunable laser has a laser resonator that includes dispersion optics for separating generated laser pulses into processed laser pulses having first and second wavelengths where the processed laser pulses are directed for travel along first and second optical paths. The laser resonator is defined at one end thereof by first and second mirrors with the first mirror being disposed in the first optical path and designed to be reflective at the first wavelength. In a similar fashion, the second mirror is disposed in the second optical path and is designed to be reflective at the second wavelength. The laser resonator is defined at another end thereof by an output mirror that is partially reflective and partially transmissive with respect to the first wavelength and the second wavelength in accordance with provided criteria. A first resonator length is defined between the output mirror and the first mirror, while a second resonator length is defined between the output mirror and the second mirror. The second resonator length is a function of the first resonator length.

BRIEF DESCRIPTION OF THE DRAWINGS

FIG. 2 is a block diagram of a laser wavelength converter for converting the infrared wavelength laser pulses to laser pulses having visible wavelengths; and FIG. 3 is a block diagram of a laser wavelength converter for converting the visible wavelength laser pulses to laser pulses having ultraviolet wavelengths.

DETAILED DESCRIPTION OF THE INVENTION

Figure 1:
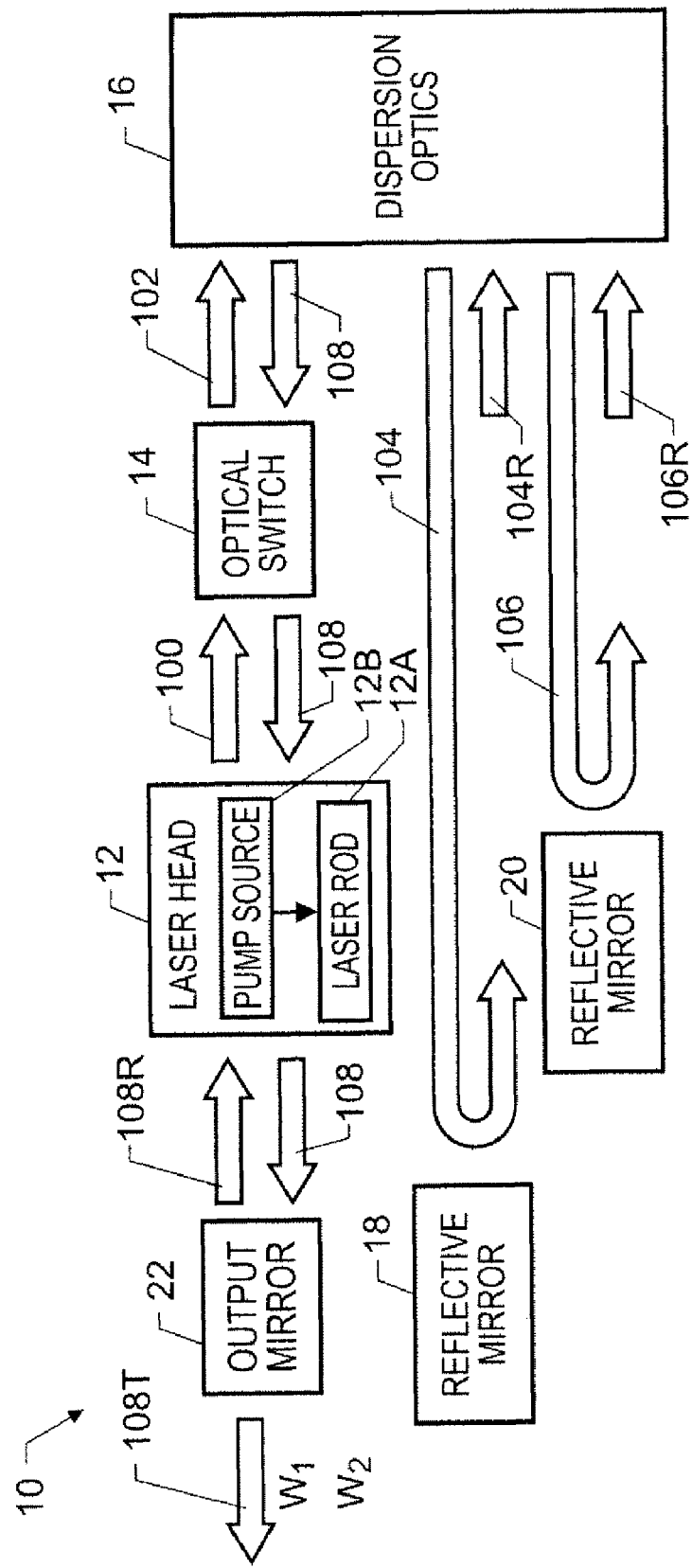
FIG. 1 is a block diagram of a multiple-wavelength tunable laser that produces simultaneous and synchronous laser pulses at two infrared wavelengths in accordance with an embodiment of the present invention.

Referring now to the drawings and more particularly to FIG. 1, a multiple-wavelength tunable laser in accordance with an embodiment of the present invention is show and is referenced generally by numeral 10. In the illustrated embodiment, tunable laser 10 simultaneously produces synchronous laser pulses at two distinct wavelengths $W_1$ and $W_2$ that can be in the infrared spectrum. However, as will be apparent to one of ordinary skill in the art, the principles of the present invention can be readily extended to simultaneously produce synchronous laser pulses at more than two wavelengths.

Tunable laser 10 includes a laser head 12 and a number of optical components that define a laser resonator. Laser head 12 typically includes a rod 12A of lasing material and a pump source 12B (e.g., a flash lamp) as would be understood in the art. For example, in terms of generating laser pulses at multiple infrared wavelengths, rod 12A is typically a neodymium-doped yttrium aluminum garnet (Nd:YAG) and pump source 12B can be, for example, a flash lamp or a diode laser. However, it is to be understood that the particular construction of laser head 12 to include the choice of lasing material and pump source are not limitations of the present invention.

Tunable laser 10 essentially defines two laser resonator paths, one for each of the two wavelengths being produced. In general, the two resonator paths share common elements and path portions, and have distinct elements and path portions. More specifically, laser head 12 generates laser pulses (i.e., when rod 12A is pumped by source 12B) that are output to an optical switch 14 (e.g., a Q-switch) as indicated by arrow 100 in accordance with conventional laser principles. The laser pulses are then passed to dispersion optics 16 as indicated by arrow 102. Dispersion optics 16 tune and separate the incoming laser pulses 102 into two distinct wavelengths by creating angular separation of the laser pulses at selected lasing transitions inherent in rod 12A. That is, dispersion optics 16 serves as the starting point for the distinct portions of the two laser resonator paths.

The angular separation of laser pulses 102 can be achieved in a variety of ways. By way of example, dispersion optics 16 can be an arrangement of dispersive prisms (e.g., Brewster angle prisms arranged for low loss) positioned to polarize laser pulses 102 at the desired transitions and to create a desired amount of angular separation. The laser pulses at the two distinct wavelengths are output from dispersion optics 16 along spatially separated paths as indicated by arrows 104 and 106.

Positioned unique distances from dispersion optics 14 and in the paths of respective laser pulses 104 and 106, are reflective mirrors 18 and 20. Reflective mirror 18 should be totally reflective with respect to light at wavelength $W_1$, while reflective mirror 20 should be totally reflective with respect to light at wavelength $W_2$. Typically, each of reflective mirrors 18 and 20 is a curved mirror as would be understood in the art. The particular positioning of mirrors 18 and 20 will be explained further below. The reflected laser pulses 104R and 106R are passed back through dispersion optics 16 where the laser pulses are re-collimated and output as laser pulses 108.

In accordance with conventional laser resonator designs, laser pulses 108 are next directed back to/through Q-switch 14 and laser head 12 before impinging on an output mirror 22. In general and as is known in the art of laser resonators, an output mirror is partially reflective and partially transmissive with respect to the laser resonator's lasing wavelength. In the present invention, output mirror 22 (e.g., a flat mirror) must be partially reflective/transmissive with respect to both wavelengths $W_1$ and $W_2$. The transmitted output pulses are indicated by arrow 108T and the pulses reflected back into the laser resonator are indicated by arrow 108R. The method for determining the reflective properties of output mirror 22 to achieve multiple wavelength reflection/transmission will be explained further below.

A great advantage of the present invention is that a single laser source can be used to produce multiple wavelengths. Since the multiple wavelength pulses use the same flat output mirror 22, the transmitted output pulses 108T at the multiple wavelengths are automatically parallel. Further, since both wavelengths are generated in the same laser rod 12A, transmitted output pulses 108T have the same pulse initiation time. In addition, tunable laser 10 is designed such that its laser resonators have the same pulse evolution time interval. This is accomplished in the present invention by adjusting the lasers and laser resonator lengths so that the pulse evolution time for each resonator is the same.

Each laser resonator is defined by common elements (i.e., laser head 12, optical switch 14, dispersion optics 16 and output mirror 22) and unique elements (i.e., reflective mirror 18 and reflective mirror 20). That is, one laser resonator has its path length defined between output mirror 22 and reflective mirror 18, while the other laser resonator has its path length defined between output mirror 22 and reflective mirror 20.

The present invention provides novel criteria to set laser resonator path length and output mirror reflectivity. Specifically, the mirror reflectivities $R_1$ and $R_2$ for output mirror 22 at wavelengths $W_1$ and $W_2$, respectively, satisfy the following relationship $$R_2 = \exp\{2L[\alpha - \alpha'(\sigma/\sigma')] + (\sigma/\sigma')\ln(R_1)\}$$

where $\alpha'$ is intrinsic losses of the laser resonator defined between mirrors 18 and 22, i.e., laser resonator associated with the first wavelength $W_1$; $\alpha$ is intrinsic losses of the laser resonator defined between mirrors 20 and 22, i.e., laser resonator associated with the second wavelength $W_2$; $\sigma'$ is the emission cross-section associated with the laser pulses at the first wavelength $W_1$ (i.e., the emission cross-section of the photon transition associated with the laser pulses at the first wavelength); and $\sigma$ is the emission cross-section associated with said laser pulses at said second wavelength (i.e., the emission cross-section of the photon transition associated with the laser pulses at the second wavelength).

The two resonator path lengths $L_1$ (between output mirror 22 and reflective mirror 18) and $L_2$ (between output mirror 22 and reflective mirror 20) satisfy the relationship $$L_2 \approx (\sigma/\sigma')L_1.$$

As mentioned above, tunable laser 10 simultaneously produces two unique-wavelength laser pulses that can be in the infrared spectrum. The transmitted laser pulses 108T can be further processed to produce laser pulses in one or both of the visible and ultraviolet spectrums. For example, transmitted laser pulses 108T (e.g., at infrared wavelengths $W_1$ and $W_2$ in the illustrated example) can be provided to a laser wavelength converter 30 illustrated in FIG. 2. Laser wavelength converter 30 can include a telescope 32 that collects and focuses laser pulses 108T onto non-linear crystal optics 34 that convert the infrared-spectrum laser pulses 108T into laser pulses at one or more visible-spectrum wavelengths. In tests of the present invention, a single crystal oriented for phase matching has been used to achieve wavelength conversion. For a laser rod 12A made from Nd:YAG, a single Beta Barium Borate (BBO) crystal ($\beta$-BaB$_2$O$_4$) was used.

For efficient non-linear interactions, the above-mentioned phase matching condition must be satisfied. Such phase matching is usually achieved by rotating the non-linear crystal in order to change the phase velocity of the interacting beams/pulses. In this way, optics 34 provides for harmonic generation as well as mixing so that optics 34 outputs laser pulses 110 in the visible spectrum.

Depending on the attributes and positioning of optics 34, the wavelength of laser pulses 110 can be $$W_3 = (W_1 \times W_2)/(W_1 + W_2)$$

$$W_4 = (W_1)/2, \text{ or}$$

$$W_5 = (W_2)/2.$$

It is to be understood that additional ones of optic 34 could be used to simultaneously provide two or all three of the visible-wavelength laser pulses without departing from the scope of the present invention.

In terms of producing simultaneous and synchronous pulses in the ultraviolet spectrum, one or more of the visible-wavelength laser pulses 110 can be provided to another laser wavelength converter 40 illustrated in FIG. 3. As shown, laser wavelength converter 40 can include a waveplate 42 that rotates the polarization of laser pulses 110. The rotated laser pulses 110R are provided to non-linear crystal optics 44 that are similar to optics 34. Optics 44 converts laser pulses 110R at one or more of wavelengths $W_3$, $W_4$, and $W_5$ into laser pulses 112 having wavelengths $$W_6 = (W_3)/2$$

$$W_7 = (W_4)/2 \text{ and/or}$$

$$W_8 = (W_5)/2.$$

The advantages of the present invention are numerous. Simultaneous and synchronous laser pulses at multiple wavelengths can be generated with a single lasing medium (e.g., a laser rod). The multiple wavelengths can include the infrared, visible, and ultraviolet spectrums. The laser can be readily tuned for specific wavelengths in accordance with the provided output mirror reflectivity and resonator path length criteria. The choice of visible and ultraviolet wavelengths can be adjusted by simple re-orientation of a single non-linear crystal type of laser wavelength converter.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A tunable laser comprising:
    a laser resonator including dispersion optics for separating generated laser pulses into processed laser pulses having first and second wavelengths traveling along first and second optical paths, respectively,
    said laser resonator defined at one end thereof by first and second mirrors with said first mirror being disposed in said first optical path and reflective at said first wavelength, and said second mirror being disposed in said second optical path and reflective at said second wavelength,
    said laser resonator defined at another end thereof by an output mirror that is partially reflective and partially transmissive with respect to said first wavelength and said second wavelength, wherein a first resonator length is defined between said output mirror and said first mirror, and wherein a second resonator length is defined between said output mirror and said second mirror, said second resonator length being a function of said first resonator length.

2. A tunable laser as in claim 1 wherein said laser resonator includes a single lasing medium.

3. A tunable laser as in claim 2 wherein said lasing medium is a neodymium-doped material.

4. A tunable laser as in claim 1 wherein said first wavelength and said second wavelength are in the infrared spectrum, said tunable laser further comprising means for converting said first wavelength and said second wavelength of said processed laser pulses transmitted by said output mirror to laser pulses having at least one wavelength in the visible spectrum.

5. A tunable laser as in claim 4, further comprising second means for converting said laser pulses having at least one wavelength in the visible spectrum to laser pulses having at least one wavelength in the ultraviolet spectrum.

6. A tunable laser as in claim 1 wherein said dispersion optics comprises a plurality of prisms.

7. A tunable laser as in claim 1 wherein said function is defined as a ratio of emission cross-section associated with said laser pulses at said second wavelength to emission cross-section associated with said laser pulses at said first wavelength.

8. A tunable laser as in claim 1 wherein said output mirror comprises a flat mirror.

9. A tunable laser as in claim 4 wherein said means for converting comprises non-linear crystal optics.

10. A tunable laser as in claim 5 wherein said second means comprises non-linear crystal optics.

11. A tunable laser comprising:
    a laser resonator including
    (i) an output mirror,
    (ii) a laser rod of length L,
    (iii) dispersion optics for separating laser pulses generated from said laser rod into laser pulses having first and second wavelengths traveling along first and second optical paths, respectively, and
    (iv) first and second wavelength-sensitive reflective mirrors disposed in said first and second optical paths, respectively,
    wherein a first resonator of path length $L_1$ is defined between said output mirror and said first reflective mirror, and a second resonator of path length $L_2$ is defined between said output mirror and said second reflective mirror;
    said output mirror having a reflectivity $R_1$ at said first wavelength and a reflectivity $R_2$ at said second wavelength defined by $$R_2 = \exp\{2L[\alpha - \alpha'(\sigma/\sigma')] + (\sigma/\sigma')\ln(R_1)\}$$

where $\alpha'$ is intrinsic losses of said first resonator,
$\alpha$ is intrinsic losses of said second resonator,
$\sigma'$ is emission cross-section associated with said laser pulses at said first wavelength,
$\sigma$ is emission cross-section associated with said laser pulses at said second wavelength; and
said path length $L_1$ and said path length $L_2$ defined by $$L_2 \approx (\sigma/\sigma')L_1.$$

12. A tunable laser as in claim 11 wherein said laser rod comprises a neodymium-doped material.

13. A tunable laser as in claim 11 wherein said first wavelength and said second wavelength are in the infrared spectrum, said tunable laser further comprising means for converting said first wavelength and said second wavelength of laser pulses transmitted by said output mirror to laser pulses having at least one wavelength in the visible spectrum.

14. A tunable laser as in claim 13, further comprising second means for converting said laser pulses having at least one wavelength in the visible spectrum to laser pulses having at least one wavelength in the ultraviolet spectrum.

15. A tunable laser as in claim 11 wherein said dispersion optics comprises a plurality of prisms.

16. A tunable laser as in claim 11 wherein said output mirror comprises a flat mirror.

17. A tunable laser as in claim 13 wherein said means for converting comprises non-linear crystal optics.

18. A tunable laser as in claim 14 wherein said second means comprises non-linear crystal optics.

19. A tunable laser comprising:
    a first laser resonator having a first resonator path that includes an output mirror, a laser rod of length L, a Q-switch and a first reflective mirror that reflects light at a first wavelength;
    a second laser resonator having a second resonator path that includes said output mirror, said laser rod, said Q-switch and a second reflective mirror that reflects light at a second wavelength;
    dispersion optics disposed between said Q-switch and each of said first reflective mirror and said second reflective mirror, said dispersion optics separating laser pulses generated from said laser rod and passed through said Q-switch into laser pulses having said first and second wavelengths with said laser pulses at said first wavelength being directed to said first reflective mirror and said laser pulses at said second wavelength being directed to said second reflective mirror,
    wherein said output mirror has a reflectivity $R_1$ at said first wavelength and a reflectivity $R_2$ at said second wavelength defined by $$R_2 = \exp\{2L[\alpha - \alpha'(\sigma/\sigma')] + (\sigma/\sigma')\ln(R_1)\}$$

where $\alpha'$ is intrinsic losses of said first laser resonator,
$\alpha$ is intrinsic losses of said second laser resonator,
$\sigma'$ is emission cross-section associated with said laser pulses at said first wavelength,
$\sigma$ is emission cross-section associated with said laser pulses at said second wavelength; and
a length $L_1$ of said first resonator and a length $L_2$ of said second resonator are governed by $$L_2 \approx (\sigma/\sigma')L_1.$$

20. A tunable laser as in claim 19 wherein said laser rod comprises a neodymium-doped material.

21. A tunable laser as in claim 19 wherein said first wavelength and said second wavelength are in the infrared spectrum, said tunable laser further comprising means for converting said first wavelength and said second wavelength of laser pulses transmitted by said output mirror to laser pulses having at least one wavelength in the visible spectrum.

22. A tunable laser as in claim 21, further comprising second means for converting said laser pulses having at least one wavelength in the visible spectrum to laser pulses having at least one wavelength in the ultraviolet spectrum.

23. A tunable laser as in claim 19 wherein said dispersion optics comprises a plurality of prisms.

24. A tunable laser as in claim 19 wherein said output mirror comprises a flat mirror.

25. A tunable laser as in claim 21 wherein said means for converting comprises non-linear crystal optics.

26. A tunable laser as in claim 22 wherein said second means comprises non-linear crystal optics.

* * * * *